United States Patent [19]
Artéon

[11] Patent Number: 5,152,651
[45] Date of Patent: Oct. 6, 1992

[54] HIGH-SPEED NUT

[76] Inventor: Marcel Artéon, 16 Rue Cino del Duca Fr 92, 200 Neailly-sur-service, France

[21] Appl. No.: 707,614

[22] Filed: May 30, 1991

[51] Int. Cl.⁵ .................. F16B 37/08; F16B 37/16
[52] U.S. Cl. .................. 411/433; 411/437; 411/935
[58] Field of Search .............. 411/433, 437, 266, 267, 411/935, 935.1, 432

[56] References Cited

U.S. PATENT DOCUMENTS

| | | | |
|---|---|---|---|
| 594,526 | 11/1897 | Glauber | 411/433 |
| 971,375 | 9/1910 | Hays | 411/433 |
| 2,257,327 | 9/1941 | Bradford | 411/433 |
| 2,789,458 | 4/1957 | Skeisvoll | 411/433 |
| 3,160,053 | 12/1964 | Devine et al. | 411/433 |

FOREIGN PATENT DOCUMENTS

| | | | |
|---|---|---|---|
| 1382310 | 11/1964 | France | 411/433 |
| 2640336 | 6/1990 | France | 411/433 |

Primary Examiner—Neill R. Wilson
Attorney, Agent, or Firm—Thomas A. O'Rourke

[57] ABSTRACT

A high-speed nut having two jaws capable of taking up two positions, one in which the central tapping is not engaged with a threaded rod, and a second in which the tapping is engaged therewith. According to the invention, the nut comprises two pieces (10, 11) which are hinged to each other about an axis (13), with pivoting of the pieces being caused by the front portion (15) of the pieces coming into contact with the object to be clamped.

3 Claims, 3 Drawing Sheets

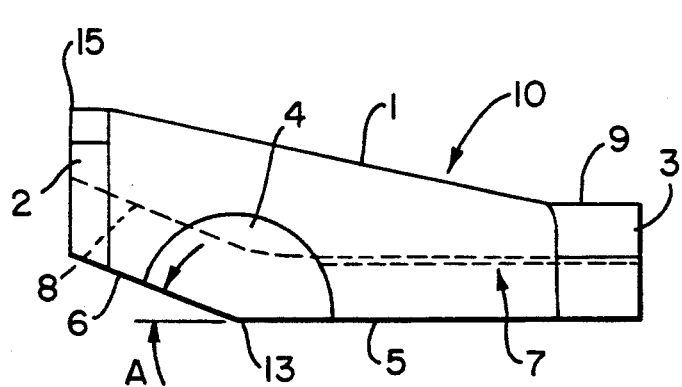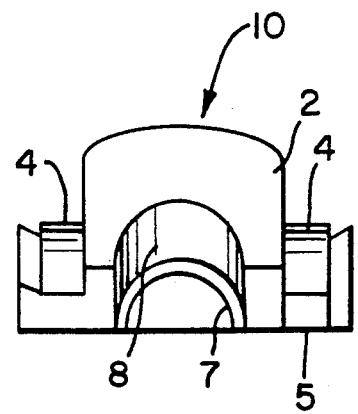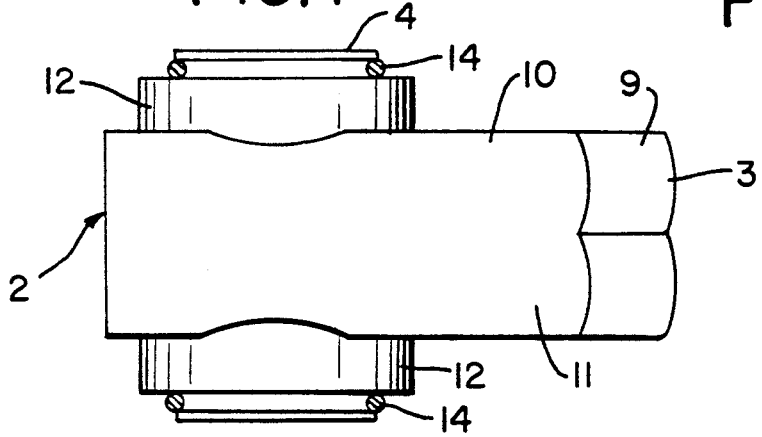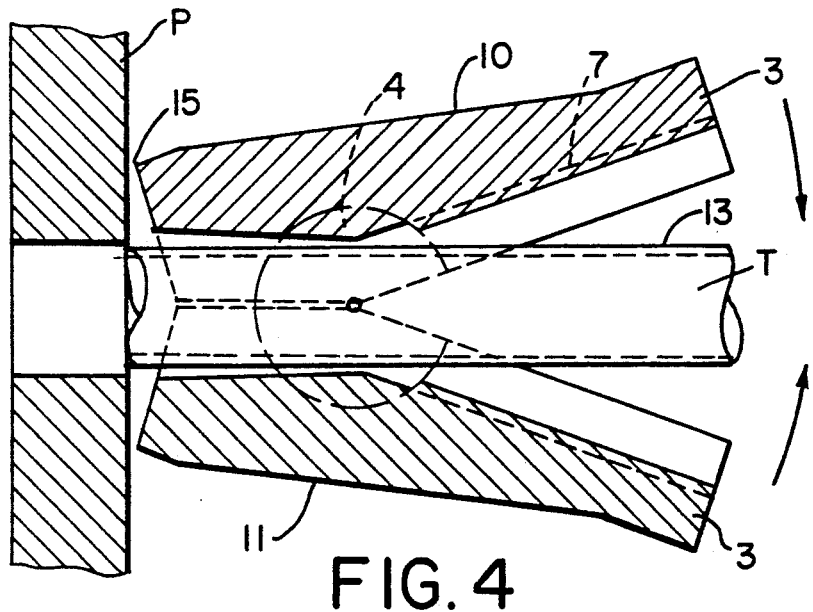
FIG. 1
FIG. 2
FIG. 3
FIG. 4

HIGH-SPEED NUT

BACKGROUND OF THE INVENTION

The present invention relates to a nut capable of being put into the tightening position on a threaded rod very easily and very quickly for the purpose of assembling together two pieces, and it is particularly, but not exclusively, intended for the building industry.

Pieces are very frequently fixed to together by one or more nut and threaded rod assemblies. The threaded rod may be constituted by a cylindrical rod having a thread over all or over a portion of its length or it may be constituted by a threaded cylindrical portion belonging to a more complex piece that is intended to withstand traction. The rod itself, or its cylindrical portion, need not be completely circular in section, and the circle representing the outside envelope of the thread in the section may be truncated by one or more flats of arbitrary shape. A rod of this type is referred to below as a "threaded rod".

In assemblies making use of threaded rods and nuts, since the threads on the rod and in the nut are engaged, it is necessary to rotate the nut to cause it to travel along the threaded rod until it comes into contact with the pieces to be assembled. This operation can be lengthly and difficult, particularly when access to the nut is difficult. An object of the present invention is to mitigate this difficulty and to provide a nut capable of being brought quickly into the clamping position. Proposals have already been made for such nuts.

FR-A-1 382 310 describes a high-speed clamping nut in which two partially tapped pieces are pivotally mounted inside a sliding ring in such a manner that in one position the nut can travel freely over the threaded rod, whereas in a second position of the pieces, the two tapped portions close together and engage the thread on the rod. It is thus the position of the ring which determines the state of the nut.

In U.S. Pat. No. 3,603,552, a nut for mounting scaffolding is constituted by two portions that are hinged to each other in such a manner that the internal tapping can be disengaged from the thread of the threaded rod over which it is to slide by means of handles.

However, without prohibitively increasing their dimensions, these nuts are incapable of counteracting large forces such as those which are encountered when assembling shuttering for casting concrete.

According to the present invention, a high-speed nut comprising two longitudinal pieces which are hinged to each other and which together define a central orifice having a first portion which is tapped and having a second portion which is substantially conical, the hinge axis of the two pieces being perpendicular to the axis of the central orifice, is characterized in that each of the pieces carries hinge means, clamping means, and mechanical connection means.

Thus, the two pieces constituting the nut are capable of pivoting about an external hinge disposed substantially one third of the way along their length to take up two positions: a first or "open" position in which the two portions constituting the tapping are spaced apart from each other, and a second or "closed" position in which the two portions are brought together to engage on the thread of the threaded rod. In the open position, the nut can travel freely over the threaded rod, e.g. by sliding linearly without rotating, thereby reaching its clamping position, and contact with the piece to be clamped automatically causes the nut to close. The object to be fixed is then clamped by rotating the nut through a few turns.

According to another characteristic of the invention, the hinge is constituted by two radial stub axles interconnected by rings.

Other characteristics and advantages appear from the following description of a particular embodiment, given purely by way of non-limiting example and made with reference to the drawings, in which:

BRIEF DESCRIPTION OF THE DRAWINGS

FIG. 1 is an elevation view of one of the two portions of a nut of the invention;

FIG. 2 is an end view of FIG. 1;

FIG. 3 is a plan view of a nut made up of the pieces assembled together;

FIG. 4 is a view of the nut in its position for linear displacement over a rod;

DETAILED DESCRIPTION OF THE INVENTION

Figure 5:
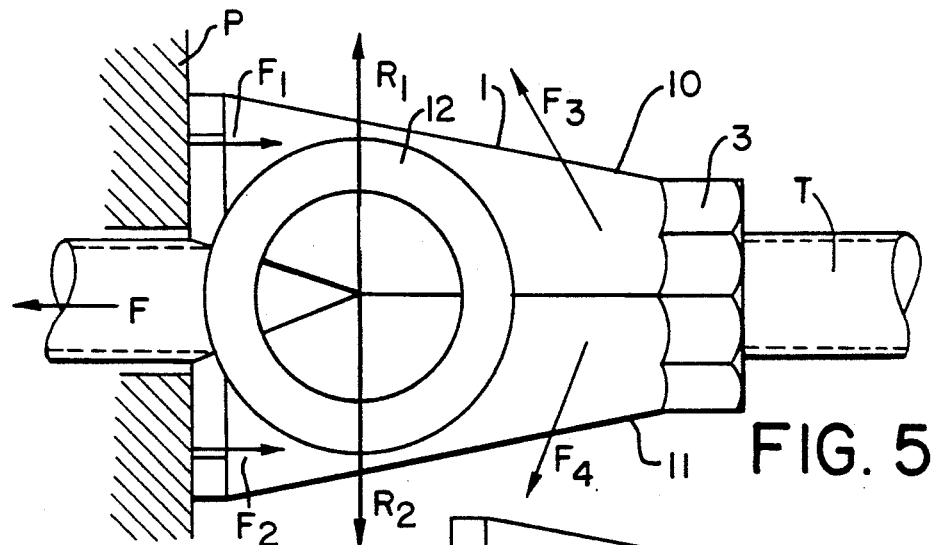
FIG. 5 is a view of the nut in the clamping position.

FIG. 1 shows one of two pieces 10 constituting a nut of the invention. It comprises a body 1 substantially in the form of a truncated cone having a front face or base 2 and a rear face or head 3. In a first embodiment, two stub axles 4 are provided on the sides of the body 1 on either side thereof, which stub axles are intended to enable the two pieces 10 and 11 to pivot relative to each other.

The bottom portion of the piece 10 has a plane face 5 which is extended by a second plane face 6 that is inclined relative to the face 5, with the two faces forming an angle of 180°—A. The two pieces, assembled together to for a nut, pivot relative to each other about a hinge point 13 to pass from the open position to the closed position and vice versa. In the example shown, pivoting takes place through an angle of value 2A. To this end, the stub axles 4 are angled in the same manner as the body of each piece. Tapping 7 is formed inside each body 1 adjacent to its head, which tapping is extended towards the base by means of a conical surface 8. Projections 9 are formed on the outside of the body 1 in the vicinity of the head 3 for the purpose of enabling the nut to be tightened by any conventional means. In the example shown, the projection 9 constitute a hexagonal shape suitable for tightening by an adjustable spanner. However, the projections 9 could be in the form of knurling, to enable the nut to be tightened by hand or could be constituted by two parallel faces for tightening by means of a fork-shaped spanner, or could be provided with fins for tightening by means of a hammer, etc.

In the example shown, rings 12 are mounted on the stub axles 4 and are retained thereon by spring clips 14. The assembly thus constitutes an integrated nut. FIG. 3 is a plan view showing the pieces 10 and 11 which are advantageously identical and symmetrical about the central axis of the nut which, once mounted on a rod, coincides with the axis of the rod.

FIG. 2 shows the piece 10 end on and it can be seen that this piece has a front face 2, a conical portion 8, tapping 7, and stub axles 4.

FIG. 4 is a section through a nut of the invention in the open position while being slid or displaced over a threaded rod T, or after such sliding or displacement has taken place. The nut is intended to assemble the rod T and an object or work P. As can clearly be seen in FIG. 4, the front portion 15 of the base 2 which projects forwards because the nut is open, comes initially into contact with the work P. This contact causes the two pieces 10 and 11 to tilt about the axis 13, thereby closing the nut and its tapped portion 7 around the rod T. The conical shell of the surface 8 facilitates pivoting. Thus, each of the two pieces pivots through an angle A. Complementary shapes (not shown) of the mortise and tenon type, formed in the faces 5 of the pieces 10 and 11 make it possible to ensure, where necessary, that the two pieces 10 and 11 are properly positioned transversely relative to transverse forces or relative to the axis of the threaded rod. Thus, it is contact pressure with the work held by the rod that provides the tension required for locking the nut. As can be seen in FIG. 5, when in use, the nut is subjected to reaction forces F1 and F2 from the work P, which reaction forces are taken up by forces exerted on the active face of the tapping, which forces are inclined at 60° to 45° as shown by arrows F3 and F4 in FIG. 5. This inclination tends to move apart the pieces 10 and 11 in the region lying between the hinge point 13 and the head 3. The resultant of the forces F1 and F2 is taken up by the rings 12 (arrows R1 and R2). Thus, it is traction force on the threaded rod T which ensures that the nut is closed, with the rings 12 being dimensioned to withstand the resultant of the forces F1+F2.

The two pieces or jaws may also be assembled together without using pivot rings. In such an embodiment (not shown) one of the stub axles is extended on each of the pieces by two parallel wings of height equal to the outside circumference of a substantially semicylindrical stub axle. During nut assembly, the wings or branches of the "U" formed in his way are folded down, e.g. by means of a hammer, about the corresponding stub axle on the other piece. Thus, the rings are no longer required and the pieces are held together laterally, while still being capable of pivoting relative to each other.

Figure 6:
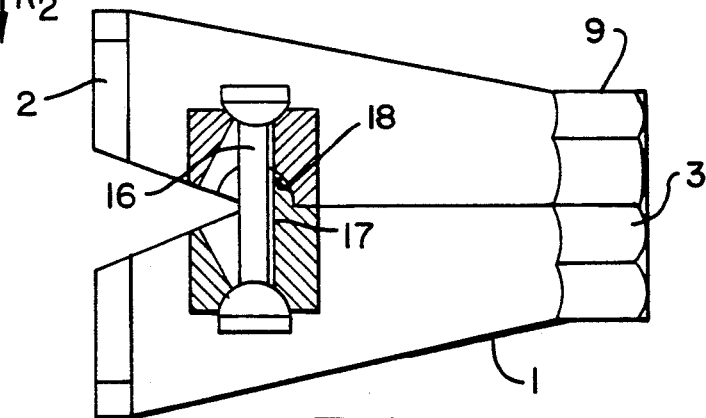
FIG. 6 shows a variant embodiment.

When the forces to be withstood are relatively low, and in particular with nuts of small dimensions, the two rings 12 may advantageously be replaced by two rivets or bolts 16 such as that shown in FIG. 6. In the first embodiment, the stub axles pivot inside the rings 12 while the rings remain, at least in theory, fixed during pivoting. I.e. there is no need for the outside shape of the rings 12 to be circular.

In FIG. 6, the two pivot points 13 are omitted, and when a force is applied, this movement is the result of a semicircular projection 17 penetrating into a likewise semicircular groove 18 where the faces 5 and 6 meet, the projection on one of the sides of a piece corresponding to a groove on the other side of the same piece. Naturally, the mechanical connection required between the pieces 10 and 11 results from the presence on each side of a spindle, pin, or rivet 16.

Figure 7:
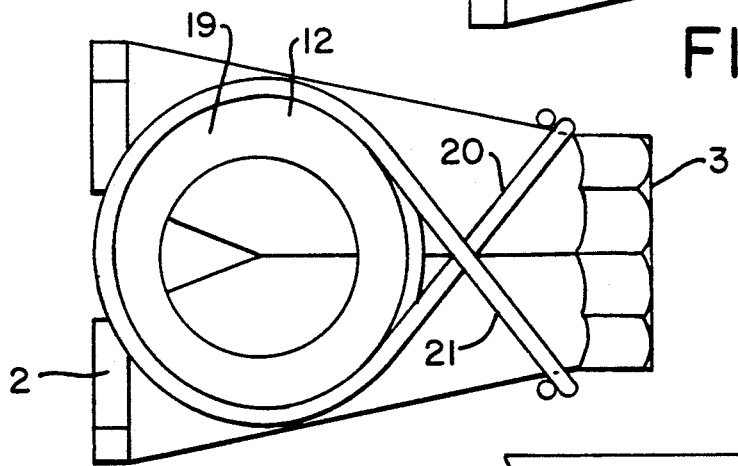
FIGS. 7 and 8 are respectively a side view and a plan view of another embodiment.
Figure 8:
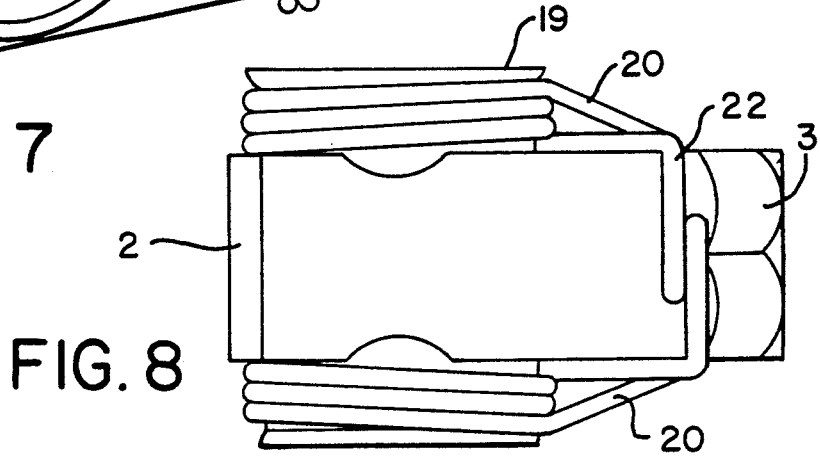

However, when the threaded rod is vertical, the nut normally falls under its own weight. When it is desired to obtain a nut which remains permanently closed, i.e. a nut in which the two tapped portions remain in connect with each other when at rest, it is possible to use the embodiment shown in FIGS. 7 and 8. In this embodiment, the pieces constituting the nut are the same as in the embodiment described with reference to FIGS. 1 to 5. I.e. The pieces 10 and 11 have stub axles 4 contained in rings 12. However, the spring clips 14 are replaced in this case by hair-pin storage 19 whose rectilinear ends 20 and 21 bear against notches 22 formed in the top surface of the pieces 10 and 11. Under test conditions, the nut is automatically closed by the return force of the spring 19. More generally, it is possible to interpose resilient return means between the two pieces 10 and 11, e.g. balls of resilient material such as neoprene, for example, which more the conical portions away from each other in order to move the cylindrical portions towards each other, in the absence of any external force. The return force is easily overcome by pressure from two fingers on the front portion of the nut.

Figure 9:
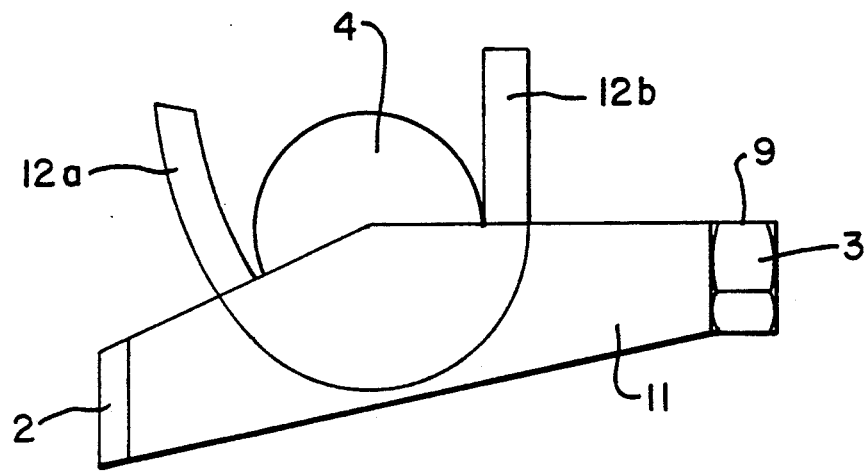
FIG. 9 shows a side view of a single piece of an alternative embodiment of the present invention before assembly.
Figure 10:
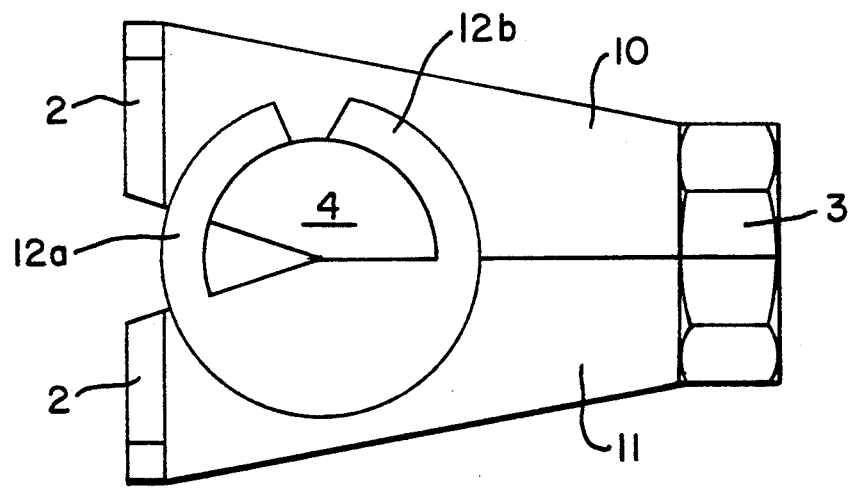
FIG. 10 shows the single piece of the present invention assembled with a corresponding piece to form a nut of the present invention.

FIG. 9 shows one piece 11 of another embodiment of the nut of the present invention before assembly. FIG. 10 shows the same piece 11 assembled with a corresponding piece 10 after folding of the wings 12a, 12b by for example, a hammer to form a ring 12 as seen in the other embodiments.

The nut is extremely easy to use. To move it along a threaded rod, it suffices merely to apply pressure to the base portion 2 causing the faces 6 of the two pieces 10 and 11 to move against each other, thereby disengaging the tapping of the nut from the threads of the threaded rod. The nut can then travel freely along the rod, and when it comes close to the part to be clamped, the pressure can be released. Under action from the spring 19, the two pieces pivot about their pivot axis 13 and the tapping is again closed. Thus, even if the rod is vertical, the nut does not fall. Further, the spring 19 acts as a spring clip preventing the rings 12 from escaping from the stub axles.

I claim:

1. A high speed nut comprising two longitudinal pieces which are hinged to each other and which together define a central orifice having a first portion which is tapped and having a second portion which is substantially conical, the hinge axis of the two pieces being perpendicular to the axis of the central orifice, wherein each of the pieces carries hinge means and mechanical connection means and wherein each piece carries a stub axle on each of its sides, said stub axle pivoting in a ring held in place by a spring clip.

2. A nut according to claim 1 wherein each piece includes two plane faces forming an angle of less than 180° to each other.

3. A high speed nut comprising two longitudinal pieces which are hinged to each other and which together define a central orifice having a first portion which is tapped and having a second portion which is substantially conical, the hinge axis of the two pieces being perpendicular to the axis of the central orifice, wherein each of the pieces carries hinge means and mechanical connection means and wherein the body of each piece has a substantially semicylindrical stub axle on either side thereof with one stub axle from each of the pieces having capable of being folded down around the corresponding stub axle of the other piece.

* * * * *